United States Patent [19]

Kittel et al.

[11] Patent Number: 4,811,826
[45] Date of Patent: Mar. 14, 1989

[54] FRICTION CLUTCH WITH INTERLOCKING FLYWHEEL AND CLUTCH COVER

[75] Inventors: Friedrich Kittel, Schweinfurt; Dieter Kolb, Bad Kissingen, both of Fed. Rep. of Germany

[73] Assignee: Fichtel & Sachs AG, Schweinfurt, Fed. Rep. of Germany

[21] Appl. No.: 78,918

[22] Filed: Jul. 28, 1987

[30] Foreign Application Priority Data

Aug. 1, 1986 [DE] Fed. Rep. of Germany ....... 3626118

[51] Int. Cl.⁴ ............. F16D 13/50; F16D 13/58
[52] U.S. Cl. ..................... 192/70.13; 192/70.27; 192/89 B; 403/316; 403/348
[58] Field of Search ............ 192/70.27, 89 B, 112, 192/70.11, 70.13, DIG. 1; 403/316, 348, 349

[56] References Cited

U.S. PATENT DOCUMENTS

| | | | |
|---|---|---|---|
| 2,296,538 | 9/1942 | Reed | 192/70.13 |
| 2,645,438 | 7/1953 | Kalikow | 403/348 X |
| 3,317,013 | 5/1967 | Smirl | 192/112 X |
| 4,555,005 | 11/1985 | Dixon | 192/70.27 |
| 4,600,092 | 7/1986 | Billet et al. | 192/70.11 |

FOREIGN PATENT DOCUMENTS 3536026 4/1968 Fed. Rep. of Germany .

Primary Examiner—Leslie A. Braun
Assistant Examiner—Richard M. Lorence
Attorney, Agent, or Firm—Toren, McGeady & Associates

[57] ABSTRACT

The friction clutch comprises a flywheel and a clutch cover which encloses a clutch disc and a presser plate pressed by a clutch main spring through the clutch disc against the flywheel. The clutch cover is fixed axially on the flywheel after the style of a bayonet catch. For this purpose the bayonet catch comprises interengaging radial projections on the flywheel and tabs which form ring groove sections on the clutch cover. The fixing of the clutch cover in the radial direction and in the circumferential direction is effected by resilient clamp elements.

14 Claims, 3 Drawing Sheets 4,811,826

FRICTION CLUTCH WITH INTERLOCKING FLYWHEEL AND CLUTCH COVER

BACKGROUND OF THE INVENTION

The invention relates to a friction clutch, especially for a motor vehicle, and especially relates to the securing of a clutch cover of the friction clutch of a flywheel.

From DE-A No. 3,536,026 a friction clutch for a motor vehicle is known in which a bell-shaped clutch cover encloses the flywheel secured on the crank-shaft and is held by radial pins on the flywheel. The pins are screwed radially into the flywheel and emerge through radial holes of a circumferential wall of the clutch cover. For the fixing of the clutch cover the pins have circumferential grooves in which the edges of the radial passage holes of the clutch cover engage under the axial spring stress of a clutch main spring.

In the known friction clutch the securing pins must take up the axial forces of the clutch main spring in subsequent operation too. Even minor wear on one of the pins, which is also weakened by the circumferential groove, varies the spring characteristic of the clutch main spring and thus the properties of the friction clutch.

The invention is directed to provide a friction clutch, especially for a motor vehicle, in which the clutch cover can be fitted very simply and securely for subsequent operation.

SUMMARY OF THE INVENTION

Within the scope of the invention the flywheel comprises several axial apertures staggered in relation to one another in the circumferential direction in the region of its external circumference and on the side axially remote from the presser plate it has an axial abutment face beside each aperture in the circumferential direction. The clutch cover comprises, on its circumferential margin adjacent to the flywheel, tabs protruding transversely of the direction of the rotation axis and associated with the apertures, which on their side axially facing the presser plate comprise counter-abutment faces intended to abut on the abutment faces of the flywheel. The arrangement is made such that the clutch cover can be fitted on to the flywheel and locked axially on the flywheel by a rotation about the rotation axis, similarly to a bayonet catch. The mutually associated abutment faces can without problem be provided with large area on stable components of the flywheel and the clutch cover, leading to long-lasting operationally reliable connections. In order to prevent unintended release of the clutch cover from the flywheel comparatively slightly dimensioned rotation-securing elements are sufficient which primarily are intended merely to prevent the clutch cover from being able to rotate in relation to the flywheel.

In a preferred development the flywheel has a plurality of radially protruding projections offset in the circumferential direction in relation to one another on its circumference, behind which the tabs engage. The tabs can be cut out of the wall material of the clutch cover and protrude for example in the circumferential direction. However especially durable locking connections are obtained if the clutch cover grasps radially externally around the projections of the flywheel and the tabs protrude radially inwards.

Especially in the last-mentioned development a fixing of the clutch cover substantially on all sides on the flywheel can be achieved, especially if radially inwardly open ring groove sections elongated in the circumferential direction are formed on the clutch cover by bendings in the region of the tabs and it is provided that the counter-abutment faces formed by the tabs are in each case inner axial wall faces of these ring groove sections. For the complete axial fixing either the axial thickness of the projections of the flywheel can be dimensioned equally to the internal axial width of the ring groove sections, or radially outwardly open ring groove pockets in which the tabs engage can be formed on the flywheel. In the latter case the axial thickness of the tabs is made equal to the internal axial width of the ring groove pockets. The ring groove pockets can be produced especially simply if one of their side faces is formed by a starter toothed ring.

The abutment faces provided for the axial fixing of the clutch cover on the flywheel preferably are plane and extend perpendicularly of the axis of rotation, for the sake of simpler production. Admittedly it can also be provided that these faces are formed by mutually matching taper faces. This achieves a radial centering.

The rotation-securing elements are preferably formed as cylindrical, radially resilient clamp elements, for example spring sleeves of thin form. The driving in of the clamp elements in assembly and the removal of the clamp elements in dismantlement become especially simple if the clamp elements are seated in bores extending perpendicularly of the abutment faces, especially approximately axially, in the region of the abutment faces of the flywheel and of the clutch cover.

The clamp elements can be provided with a head by which they can be drawn out of the bores in dismantlement. In this embodiment the bores can be formed as blind bores in order to form an end stop for the clamp elements in assembly. A starter toothed ring fitted on to the flywheel can expediently be used as end stop. However the bores can also be formed as through-passing holes so that the securing elements can be driven out again in the driving-in direction.

To facilitate assembly in a preferred development rotation stops are provided on the flywheel and fix the clutch cover in the correct assembly position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Examples of embodiment of the invention will be explained in greater detail below by reference to a drawing, wherein:

FIG. 2 shows an axial longitudinal section through the upper half of the friction clutch, seen along a line II—II in FIG. 1

DETAIL DESCRIPTION OF THE DRAWINGS

Figure 1:
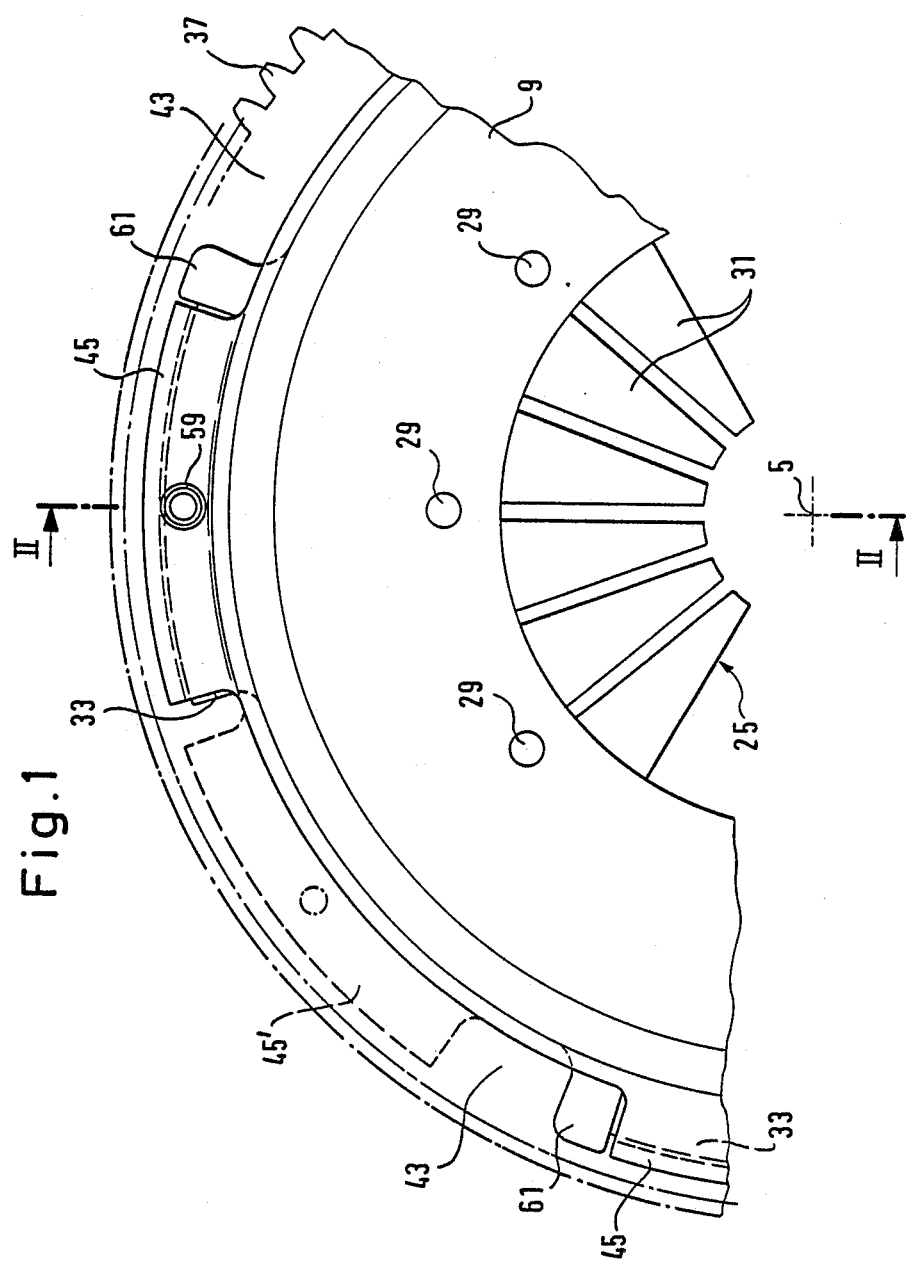
Figure 2:
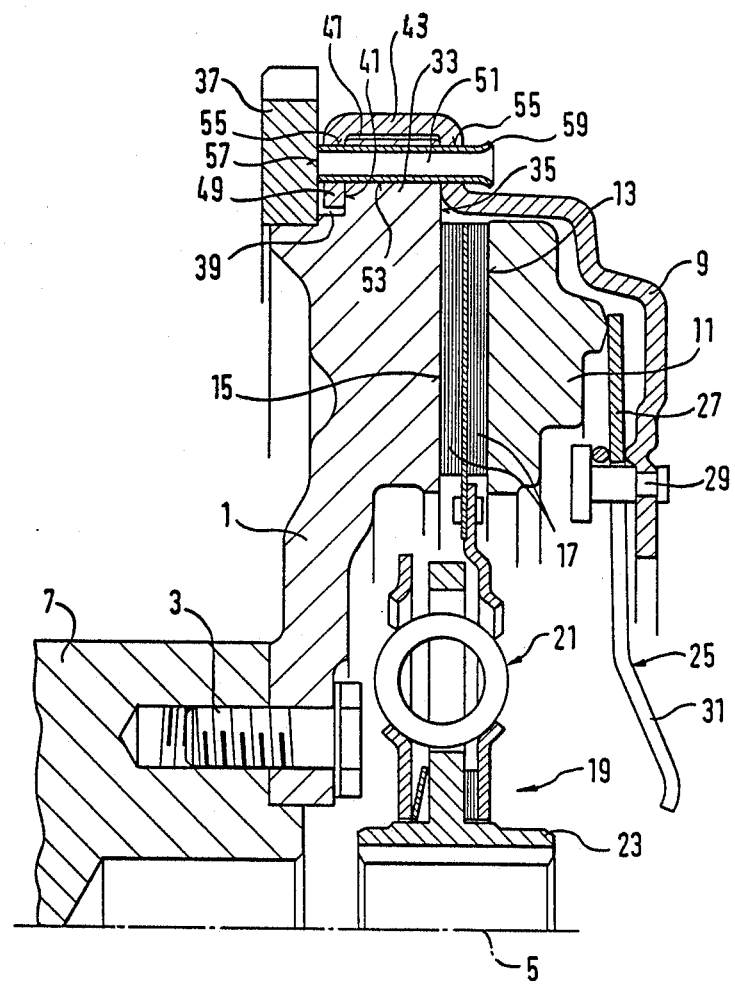
FIGURE 2 shows a partial axial view of a motor vehicle friction clutch.

The friction clutch as represented in FIGS. 1 and 2 comprises a flywheel 1 which is fitted with screws 3 on the gear end of a motor vehicle internal combustion engine crank-shaft 7 rotating about a rotation axis 5. An annular bell-type clutch cover 9 is secured on the flywheel 1 in a manner explained in greater detail hereinafter. In the clutch cover 9 there is arranged a presser plate 11 of annular disc form which is guided in the usual manner non-rotatably but axially displaceably on the unit consisting of the flywheel 1 and the clutch cover 9. The presser plate 11 has a flat friction face 13 extending perpendicularly of the rotation axis 5, which lies axially opposite to a counter-friction face 15 of the flywheel 1 which likewise is flat and extends perpendicularly of the rotation axis 5. Between the friction faces 13, 15 there are arranged friction linings 17 of a conventional clutch friction disc 19. The clutch friction disc 19 comprises a torsional vibration damper 21 and is connected through its hub 23 non-rotatably but axially displaceably with an input shaft (not illustrated further) of a change-speed gear. A clutch main spring formed as diaphragm spring 25 is braced in between the clutch cover 9 and the presser plate 11. The diaphragm spring 25 has a part 27 of annular disc form which rests with its external circumference on the presser plate 11 and is guided in the region of its internal circumference through support rivets 29 on the clutch cover 9. On the internal circumference of the annular part 27 spring tongues 31 protrude radially inwards. The spring tongues 31 can be pressed towards the flywheel 1 by means of a releaser (not illustrated further) acting on the spring tongues 31, whereby the clutch is disengaged.

The clutch cover 9 is fixed axially on the flywheel 1 by a kind of bayonet catch. From the flywheel 1 several projections 33 staggered in relation to one another in the circumferential direction protrude radially. The projections 33 have a flat abutment face 35 perpendicular to the rotation axis 5 in plane extension of the counter-presser face 15, on their side axially facing the presser plate 9. On the side of the projections 33 axially remote from the counter-presser face 15 the flywheel 1 carries a starter toothed ring 37 for the engagement of a starter pinion (not shown further) of the internal combustion engine. The starter toothed ring together with the projections 33 forms radially outwardly open ring groove pockets 39 which are limited from the projections 33 by plane abutment faces 41 extending perpendicularly of the rotation axis 5. Between the projections 33 in the circumferential direction apertures 43 are provided on the flywheel 1.

On the circumferential margin of the clutch cover 9 adjacent to the flywheel 1 tabs 45 are formed in the angle positions of the projections 33 and apertures 43 which reach radially outwardly past the projections 33 and form radially inwardly open ring groove sections 47 in which the projections 33 engage. The tabs 45 have radially inwardly bent over end parts 49 which reach into the ring groove pockets 39. The axial internal width of the ring groove sections 47 is made equal to the axial distance between the abutment faces 35, 41 so that the clutch cover 9 is fixed on the projections 33 axially to both sides.

In the radial direction the tabs 45 have slight play in relation to the projections 33. The fixing in the radial direction and in the circumferential direction takes place by radially resilient, cylindrical clamp elements 51 of sleeve form which are seated in mutually aligned bores 53, 55, parallel to the rotation axis 5, of the projections 33 and of the tabs 45. The bores 53, 55 extend continuously to the starter toothed ring 37 which with a side face 57 limiting the ring groove pockets 39 forms a stop for the securing elements 51. The securing elements 51 protrude from the clutch cover 9 on the side axially remote from the starter toothed ring 37 and here carry a head 59 by means of which they can be withdrawn from the bores 53, 55 in the dismantlement of the clutch.

Rotation stops 61, on which the tabs 45 rest in the position in which the bores 53, 55 are aligned with one another are formed on the flywheel 1 each on the same side of the projections 33 in the circumferential direction A clutch of the kind explained above can be assembled and dismantled comparatively simply. For assembly the clutch cover 9 is set upon the flywheel 1 in an angular position in which the tabs 45 lie axially opposite to the apertures 43, as indicated in FIG. 1 at 45' by a chain line. The clutch cover 9 is then rotated in relation to the flywheel 1 into a position in which the projections 33 engage in the ring groove sections 47 and the tabs 45 rest on the rotation stops 61. In this position the bores 53, 55 are aligned so that the clamp elements 51 can be driven into the bores 53, 55 until they abut on the abutment face 57 of the starter toothed ring 37. For dismantlement the clamp elements 51 are extracted by their heads 59 and the clutch cover 9 is unlocked by opposite rotation in relation to the flywheel 1. It is understood that the diaphragm spring 25 can be brought into its release position to facilitate the assembly and dismantlement, by suitable accessories, in order that the clutch cover 9 can be installed and removed without initial stress.

Figure 3:
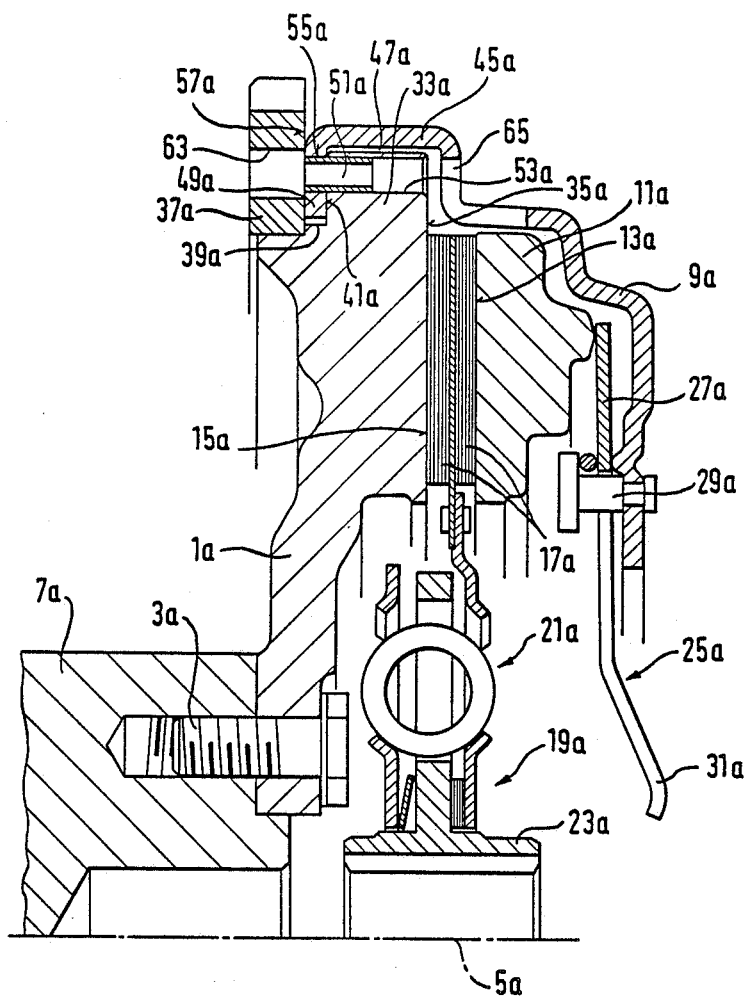
FIG. 3 shows an axial longitudinal section through a variant of the friction clutch.

FIG. 3 shows a variant of the friction clutch as represented in FIGS. 1 and 2. Parts of like effect are designated in FIG. 3 by the reference numerals of FIGS. 1 and 2 and provided with the letter a for distinction. For the explanation of these parts reference is made to the description of FIGS. 1 and 2.

The friction clutch according to FIG. 3 differs from the clutch according to FIGS. 1 and 2 essentially in that the axial width of the radially inwardly open ring groove sections 47a formed by the tabs 45a is greater than the axial thickness of the projections 33a, that is to say it is greater than the distance between the faces 35a and 41a. The axial fixing of the clutch cover 9a is effected by means of the end parts 49a of the tabs 45a in the radially outwardly open ring groove pockets 39a. The axial internal width of the ring groove pockets 39a is made equal to the thickness of the end parts 49a so that the end parts 49a are held between the abutment faces 41a formed by the projections 33a and the abutment face 57a of the starter toothed ring 37a.

The radial fixing of the clutch cover 9a, held with radial play on the flywheel 1a, and the fixing in the circumferential direction are again effected by radially resilient clamp elements 51a of sleeve form which are seated in mutually aligned bores 53a, 55a of the projections 33a and of the end parts 49a of the tabs 45a. The clamp elements 51a have cylinder form throughout and are driven by way of introduction openings 65 of the clutch cover into the bores 53a, 55a of the projections 33a and end parts 49a respectively. The starter toothed ring 37a has through-passing holes 63 axially opposite to the bores 53a, through which the clamp elements 51a can be driven out again in the drive-in direction in the dismantlement of the clutch. The assembly and dismantlement of the clutch otherwise take place in the manner as explained with reference to FIGS. 1 and 2.

While specific embodiments of the invention have been shown and described in detail to illustrate the application of the inventive principles, it will be understood that the invention may be embodied otherwise without departing from such principles.

What we claim is:

1. A friction clutch, especially for a motor vehicle, comprising a flywheel rotatable about a rotation axis, a clutch cover secured removably on the flywheel, a presser plate arranged in the clutch cover and non-rotatably but axially movable in relation to the flywheel, a clutch friction disc arranged axially between the flywheel and the presser plate, a clutch main spring braced in between the clutch cover and the urging plate and pressing the presser plate and the clutch friction disc toward the flywheel, said flywheel comprising several apertures spaced radially outwardly from and extending continuously through said flywheel in the axial direction of the rotation axis and being offset in relation to one another in the circumferential direction, in the region of the flywheel's external circumference, and an axially spaced abutment face between each aperture in the circumferential direction on a side of said flywheel axially remote from the presser plate, said clutch cover comprising on the radially outer circumferential margin thereof adjacent to the flywheel, tabs corresponding to the apertures of the flywheel and protruding in part transversely of the direction of the rotation axis, said tabs having sides extending transversely of the axial direction of the rotation axis and facing toward and comprising counter-abutment faces intended to abut on the abutment faces of the flywheel, wheel in such manner that the clutch cover can be fitted axially on to the flywheel with the tabs passing in the direction of the rotation axis through the apertures and can be locked in a locking position axially on the flywheel by a rotation relative to the flywheel about the rotation axis, and said flywheel and said clutch cover comprising at least one pair of openings aligned with one another in the locking position, into which a rotation-securing element is releasably inserted.

2. A friction clutch according to claim 1, wherein the flywheel comprises on its radially outer circumference a plurality of radially protruding projections offset in relation to one another in the circumferential direction, which form the apertures in the circumferential direction between said projections and form the abutment faces thereon on the side axially remote from the presser plate.

3. A friction clutch according to claim 2, wherein the clutch cover extends in the axial direction of the rotation axis over the projections of the flywheel in the region of the tabs wherein at least end parts of the tabs protrude radially inwards and engage said projections.

4. A friction clutch according to claim 3, wherein the clutch cover comprises, in the region of the tabs, radially inwardly open ring groove sections elongated in the circumferential direction for the reception of the projections of the flywheel, the counter-abutment faces of the tabs forming internal axially facing wall faces of the ring groove sections.

5. A friction clutch according to claim 4, wherein the axial thickness of the projections of the flywheel is made substantially equal to the internal axial width of the ring groove sections.

6. A friction clutch according to claim 4, wherein the flywheel comprises, on a side of the projections axially remote from the presser plate, radially outwardly open ring groove pockets for the reception of the end parts of the tabs of the clutch cover, the internal axial width of which is substantially equal to the axial thickness of the end parts of the tabs.

7. A friction clutch according to claim 6, wherein on the flywheel there is secured a starter toothed ring having a side face axially facing the clutch cover and forming an internal axially facing wall face of the ring groove pockets.

8. A friction clutch according to claim 1, wherein the rotation-securing elements are formed as cylindrical, radially resilient clamp elements.

9. A friction clutch according to claim 8, wherein a plurality of the clamp elements are each inserted into openings formed as bores penetrating the tabs and the flywheel and extending approximately axially parallel with the rotation axis.

10. A friction clutch according to claim 9, wherein the clamp elements have an end protruding on a side thereof axially remote from the presser plate.

11. A friction clutch according to claim 10, wherein a starter toothed ring forming an axial stop for the clamp elements is secured on the flywheel on a side thereof axially remote from the presser plate.

12. A friction clutch according to claim 9, wherein the bores completely penetrate the flywheel and the tabs of the clutch cover in such manner that the clamp elements can be driven in and also driven out again.

13. A friction clutch according to claim 8, wherein the clutch cover is axially locked by means of its tabs with radial spacing outwardly from the flywheel and is fixed in radially centered manner on the flywheel by means of the clamp element.

14. A friction clutch according to claim 1, wherein the flywheel comprises at least one rotation stop for the clutch cover, against which the clutch cover abuts in the locking position, and in which the openings provided for the reception of the rotation-securing element are aligned with one another.

* * * * *